United States Patent [19]

Meyer

[11] Patent Number: 4,809,910

[45] Date of Patent: * Mar. 7, 1989

[54] APPARATUS FOR PROVIDING A SEMIAUTOMATIC IRRIGATION SYSTEM

[75] Inventor: Larry P. Meyer, Walla Walla, Wash.

[73] Assignee: Nelson Irrigation Corporation, Walla Walla, Wash.

[*] Notice: The portion of the term of this patent subsequent to Mar. 15, 2005 has been disclaimed.

[21] Appl. No.: 49,406

[22] Filed: May 14, 1987

Related U.S. Application Data

[63] Continuation-in-part of Ser. No. 871,374, Jun. 6, 1986, Pat. No. 4,730,773.

[51] Int. Cl.⁴ .............................................. B05B 17/04
[52] U.S. Cl. ......................................... 239/1; 137/15; 239/70; 239/201; 239/210; 239/570; 239/583; 251/149.5; 251/149.9
[58] Field of Search ................. 239/1, 67, 69, 70, 200, 239/201, 202, 207, 210, 570, 583; 251/61.4, 149.5, 149.9; 137/15, 614.06

[56] References Cited

U.S. PATENT DOCUMENTS

| | | | |
|---|---|---|---|
| 660,789 | 10/1900 | Doble | 239/583 |
| 1,762,503 | 6/1930 | Buckner | 239/201 |
| 1,855,264 | 4/1932 | Thompson | 239/201 |
| 2,772,067 | 11/1956 | Wilson . | |
| 3,266,768 | 8/1966 | Muschett | 251/149.5 |
| 3,472,482 | 10/1969 | Gardner | 251/149.5 |
| 3,559,887 | 2/1971 | Meyer . | |
| 3,726,477 | 4/1973 | Shapiro | 239/70 |
| 3,744,720 | 7/1973 | Meyer . | |
| 3,865,138 | 2/1975 | Jones | 239/70 |
| 3,973,752 | 8/1976 | Boelkins | 251/149.9 |
| 3,991,939 | 11/1976 | Maclay | 239/70 |
| 4,153,202 | 5/1979 | Meyer . | |
| 4,222,411 | 9/1980 | Herzan et al. | 251/149.9 |
| 4,271,865 | 6/1981 | Galloway et al. | 251/149.9 |
| 4,359,066 | 11/1982 | Hunt | 251/149.9 |
| 4,468,225 | 8/1984 | Tcheraz | 251/149.9 |
| 4,592,505 | 6/1986 | Bruninga | 239/69 |
| 4,730,773 | 3/1988 | Meyer | 239/1 |

FOREIGN PATENT DOCUMENTS

| | | | |
|---|---|---|---|
| 613328 | 1/1961 | Canada | 251/61.4 |
| 793980 | 4/1958 | United Kingdom | 251/61.4 |

Primary Examiner—Andres Kashnikow
Assistant Examiner—Michael J. Forman
Attorney, Agent, or Firm—Cushman, Darby & Cushman

[57] ABSTRACT

Apparatus for temporarily accessing water under pressure comprising access structure having a main outlet and a pilot pressure outlet for containing the water under pressure and water accessing structure cooperable therewith to obtain temporary access to the water under pressure. A main interengaging connection is provided for manually establishing a mechanical connection of the accessing and access structures without establishing communication of the water under pressure through the main outlet. A second interengaging connection is provided for manually establishing a controllable pilot pressure flow path through the pilot pressure outlet to the accessing structure for water under pressure contained within the access structure. A power operated assembly is mounted in the pilot pressure flow path for selectively communicating water under pressure to the accessing structure through the pilot pressure flow path. An assembly is provided for utilizing the pilot water under pressure selectively communicated to the accessing assembly as a power source to establish communication of the water under pressure contained in the access structure with the accessing structure through the main outlet.

35 Claims, 7 Drawing Sheets

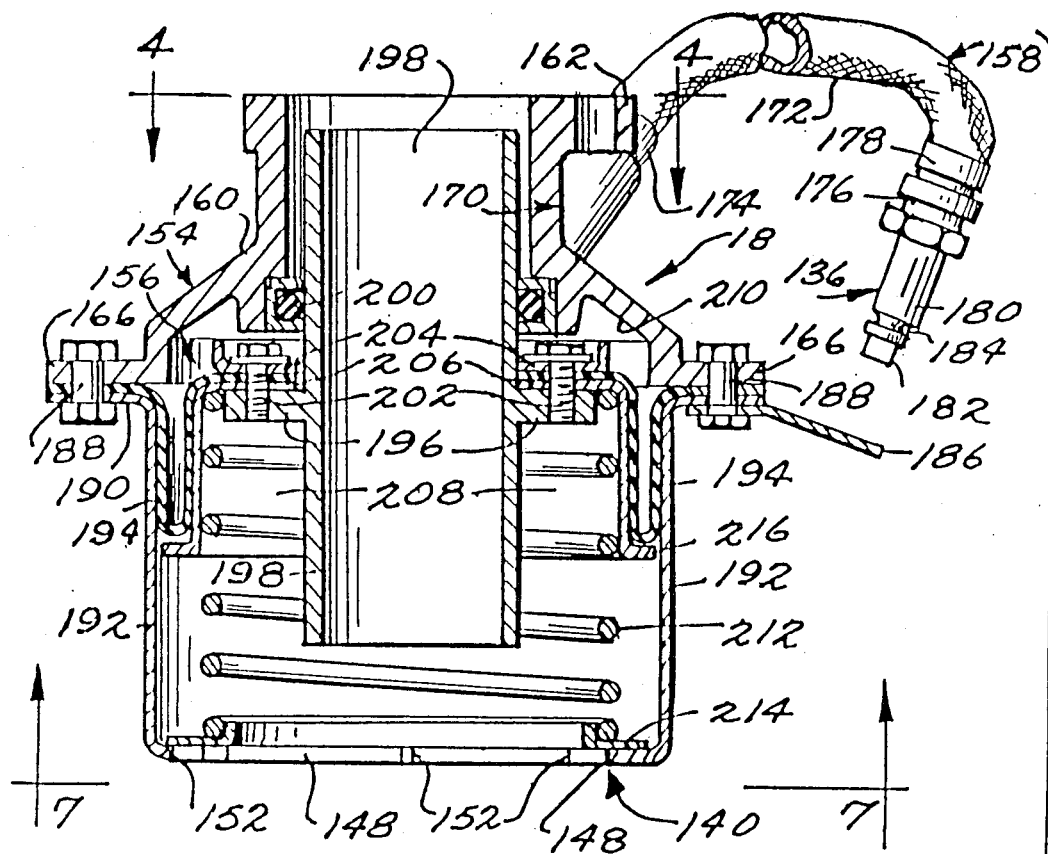
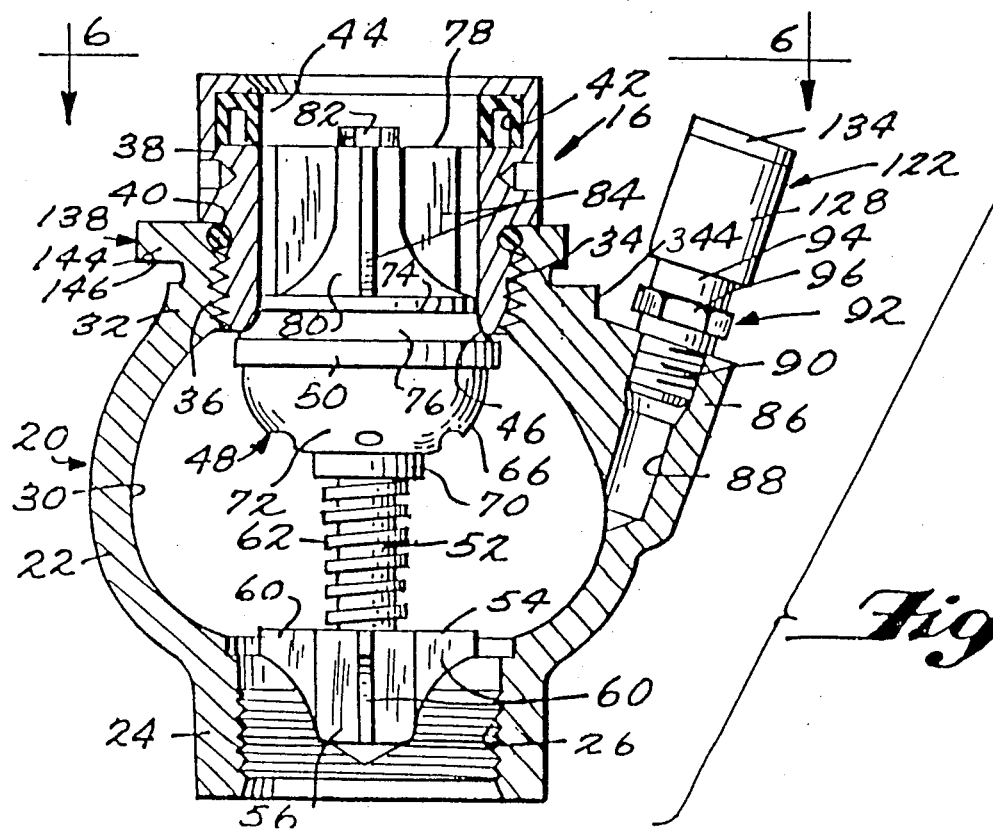
Fig. 3.

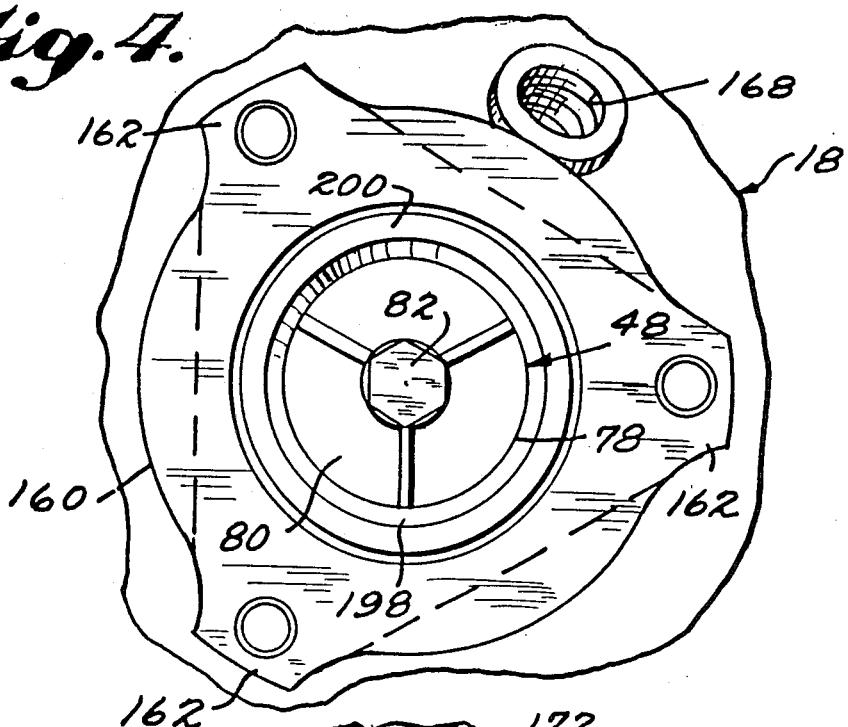
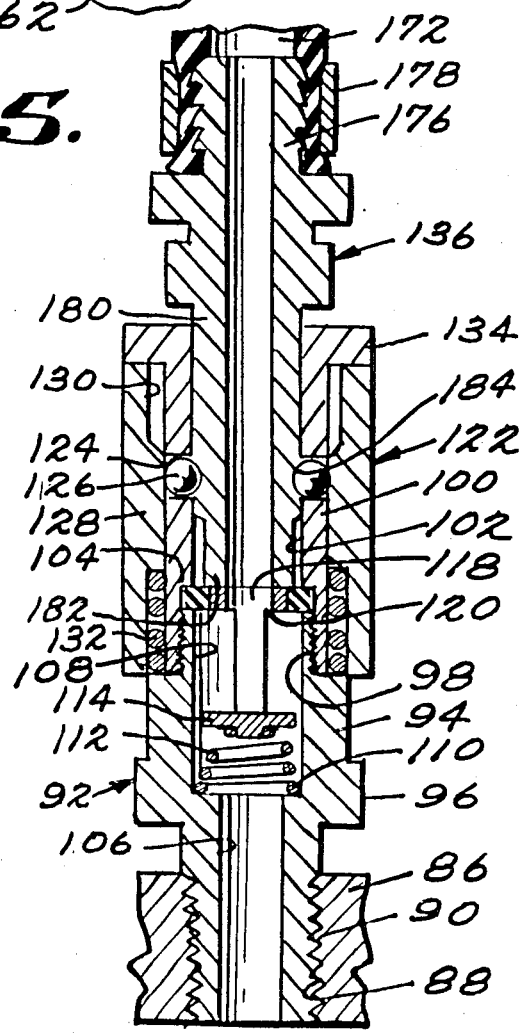

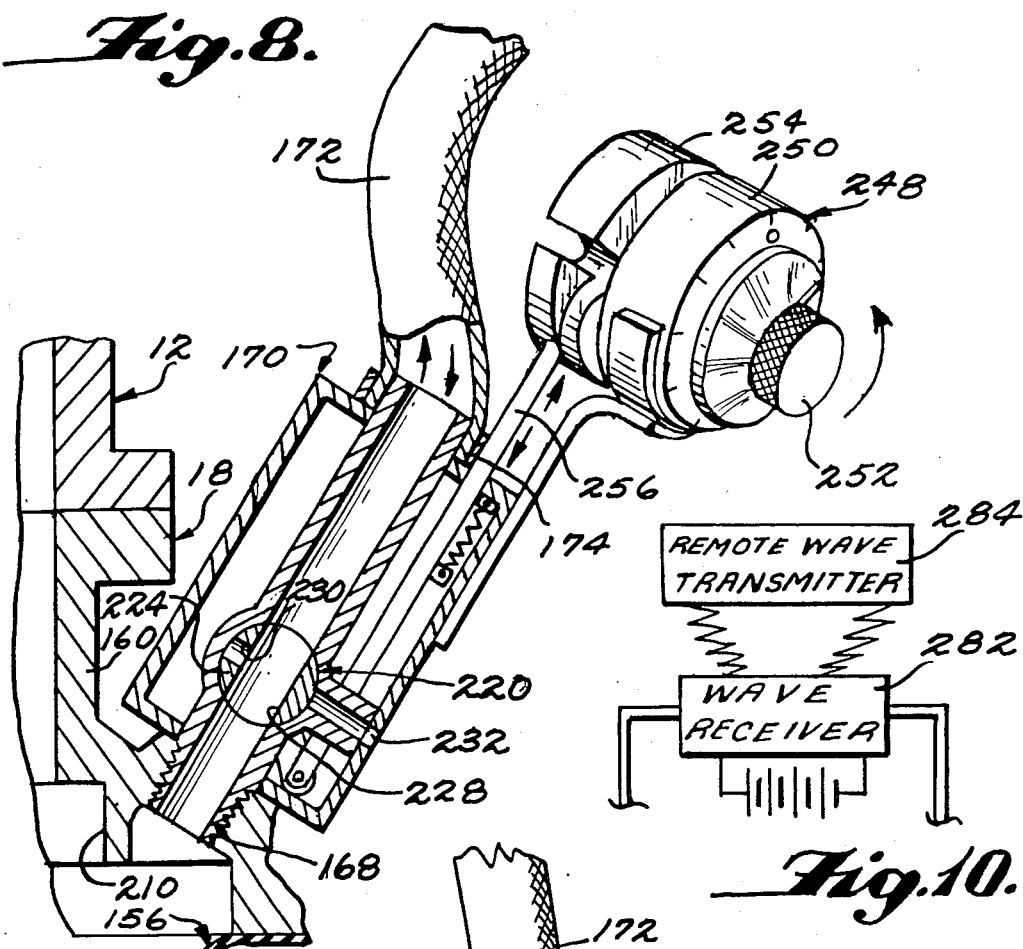
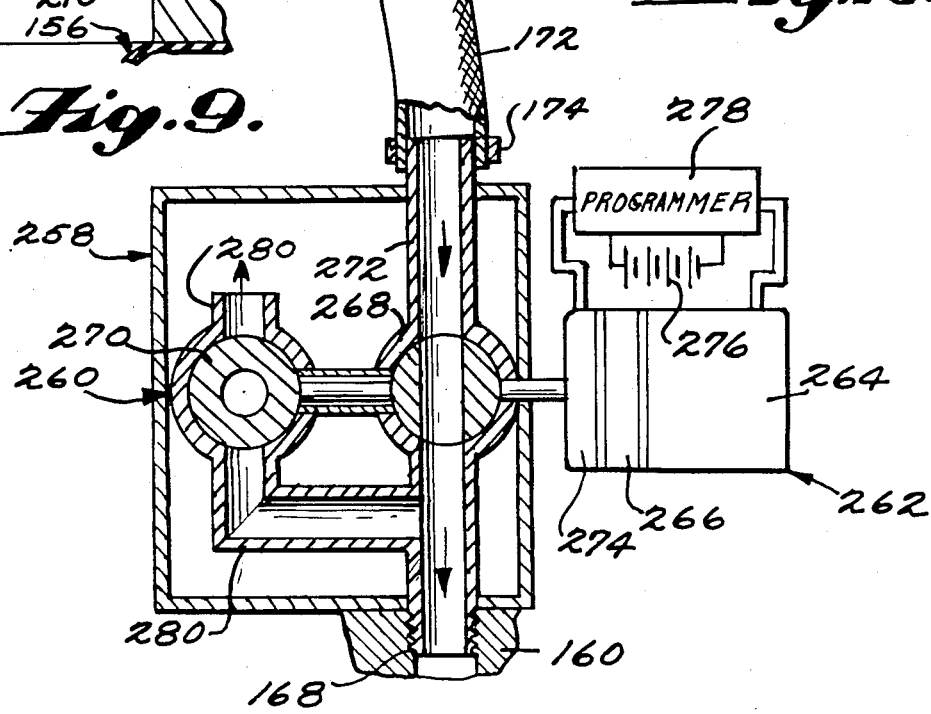

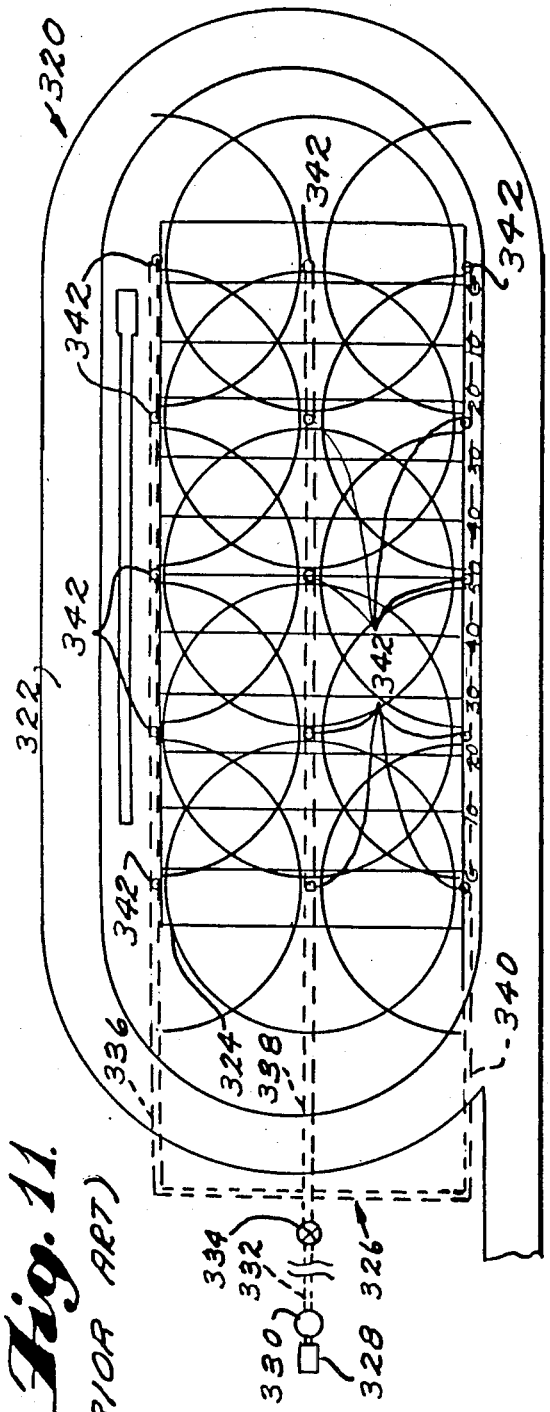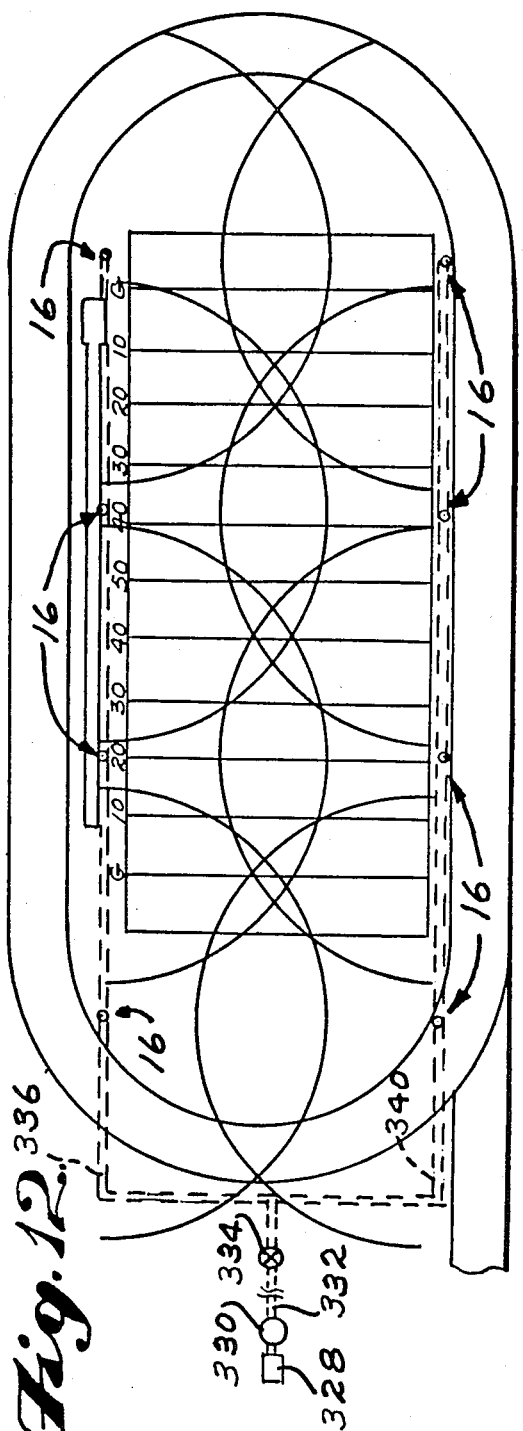

APPARATUS FOR PROVIDING A SEMIAUTOMATIC IRRIGATION SYSTEM

This specification constitutes a continuation-in-part of my copending application, Ser. No. 871,374, filed June 6, 1986, now U.S. Pat. No. 4,730,773 issued Mar. 15, 1988 entitled ACCESS ASSEMBLY FOR UNDERGROUND IRRIGATION SYSTEMS AND ACCESSING ASSEMBLY COOPERABLE THEREWITH.

This invention relates to sprinkler irrigation and more particularly to improvements in sprinkler irrigation of relatively large areas such as agricultural fields, athletic fields, golf courses and the like.

In my earlier application there is disclosed an improved method and apparatus for obtaining temporary access to a source of water under pressure. The apparatus involved the provision of an access structure for containing the fluid under pressure and a separate accessing structure cooperable with the access structure to obtain temporary access to the fluid under pressure contained in the access structure. More specifically, the access structure was provided with a main outlet and a pilot pressure outlet. The access to the fluid under pressure is obtained through the main outlet and the pilot pressure outlet is used to obtain that access. The method involved the manual establishment of a mechanical connection of the accessing structure with the access structure without establishing communication of the fluid under pressure contained in the access structure with the accessing structure through the main outlet. Secondly, a pilot pressure flow path through the pilot pressure outlet to the accessing structure is manually established for fluid under pressure contained within the access structure. The fluid under pressure communicated with the accessing structure through the pilot pressure flow path is then utilized as a power source to establish communication of the fluid under pressure contained in the access structure with the accessing structure through the main outlet. Preferably, the manually established mechanical connection of the accessing structure with the access structure is less rigid than the rigidity finally required and the fluid under pressure communicated to the accessing assembly through the pilot pressure flow path is utilized as a power source to rigidify the manually established mechanical connection to the rigidity finally required.

As utilized in carrying out a sprinkler irrigation system, each accessing assembly is connected with a sprinkler head assembly so that when access to the water under pressure in the access assembly is obtained, the water flows outwardly through the sprinkler head assembly. The arrangement is particularly suitable for high capacity sprinkler head assemblies which are moved to successive access assemblies in the system. Moreover, the procedure of effecting an initial mechanical connection which can be simply accomplished and a subsequent power rigidification of the connection materially lessens the manual problems presented in effecting movement from one access assembly to the next. In the arrangement disclosed in my aforesaid application, the accessing assembly is provided with a quick coupler for connection with the pilot pressure outlet in such a way as to move the pilot pressure valve into its open position thus communicating the water under pressure in the access assembly with the operating means of the accessing assembly which serves to move the main valve of the access assembly into an open position. With this arrangement, control of the length of operation of the sprinkler head was dependent upon either a manual disconnection of the accessing assembly from the particular access assembly, or a shutting-off of the source of water under pressure to the access assembly to which the accessing assembly is connected.

An object of the present invention is to provide an improvement in the apparatus of my prior application which renders it readily capable of being controlled by extraneous power means so that, for example, once access has been obtained and the sprinkler head assembly is in operation shut-off can be accomplished without the necessity of a manual movement or a water shut-off. In accordance with the principles of the present invention this objective is obtained by utilizing a power source other than the contained fluid under pressure to selectively control the communication of the fluid under pressure contained in the access structure with the accessing structure through the pilot pressure flow path. Preferably the other source of power constitutes a generated electrical current, a battery or a spring actuated timer assembly. Preferably the mechanism which utilizes the other power source is carried by the accessing assembly because there are a lesser number of accessing assemblies in a system than access assemblies. Nevertheless, it is within the contemplation of the invention to have the mechanism carried by the access assembly.

In one embodiment, the mechanism embodies a solenoid for actuating a control valve in the pilot pressure flow path. The electrical current for operating the solenoid assembly is provided as a selectively transmitted generated electrical current through a wiring system following the conduit system and having an outlet mounted with respect to each access structure. Each accessing structure which carries a solenoid and control valve is provided with an outlet plug for detachable connection with the electrical outlet provided by each access structure.

In another embodiment, the power source is in the form of a spring and the mechanism constitutes a spring actuated timer for effecting the movement of the control valve. Still another embodiment utilizes a battery for driving an electrical motor to effect movement of the control valve, the energization of the motor being under the control of either a computerized programmer or a wave receiver for receiving waves in the form of remotely transmitted electromagnetic signals.

Another object of the present invention is the provision of an accessing assembly of the type described which is simple in construction, effective in operation and economical to manufacture.

These and other objects of the present invention will become more apparent during the course of the following detailed description and appended claims.

The invention may best be understood with reference to the accompanying drawings wherein an illustrative embodiment is shown.

In the drawings:

FIG. 3 is a view similar to FIG. 2 showing the access and accessing assemblies separated;

FIG. 4 is a fragmentary top plan view of the access and accessing assemblies taken along the line 4—4 in FIG. 3 with the hose line removed;

FIG. 5 is an enlarged fragmentary sectional view taken along the line 5—5 of FIG. 2;

FIG. 8 is a somewhat schematic view of another embodiment of the control valve and power operated actuator constructed in accordance with the principles of the present invention.

FIG. 9 is a somewhat schematic view of still another form of control valve and power operated actuator embodying the principles of the present invention.

FIG. 10 is a schematic view showing a variation in accordance with the invention of the power operated actuator shown in FIG. 10;

FIG. 11 is a schematic layout or top plan view showing a conventional sprinkler irrigation system applied to an athletic field including an oval track defining a football playing area therein; and, FIG. 12 is a view similar to FIG. 11 showing a system embodying the principles of the present invention applied thereto.

Figure 1:
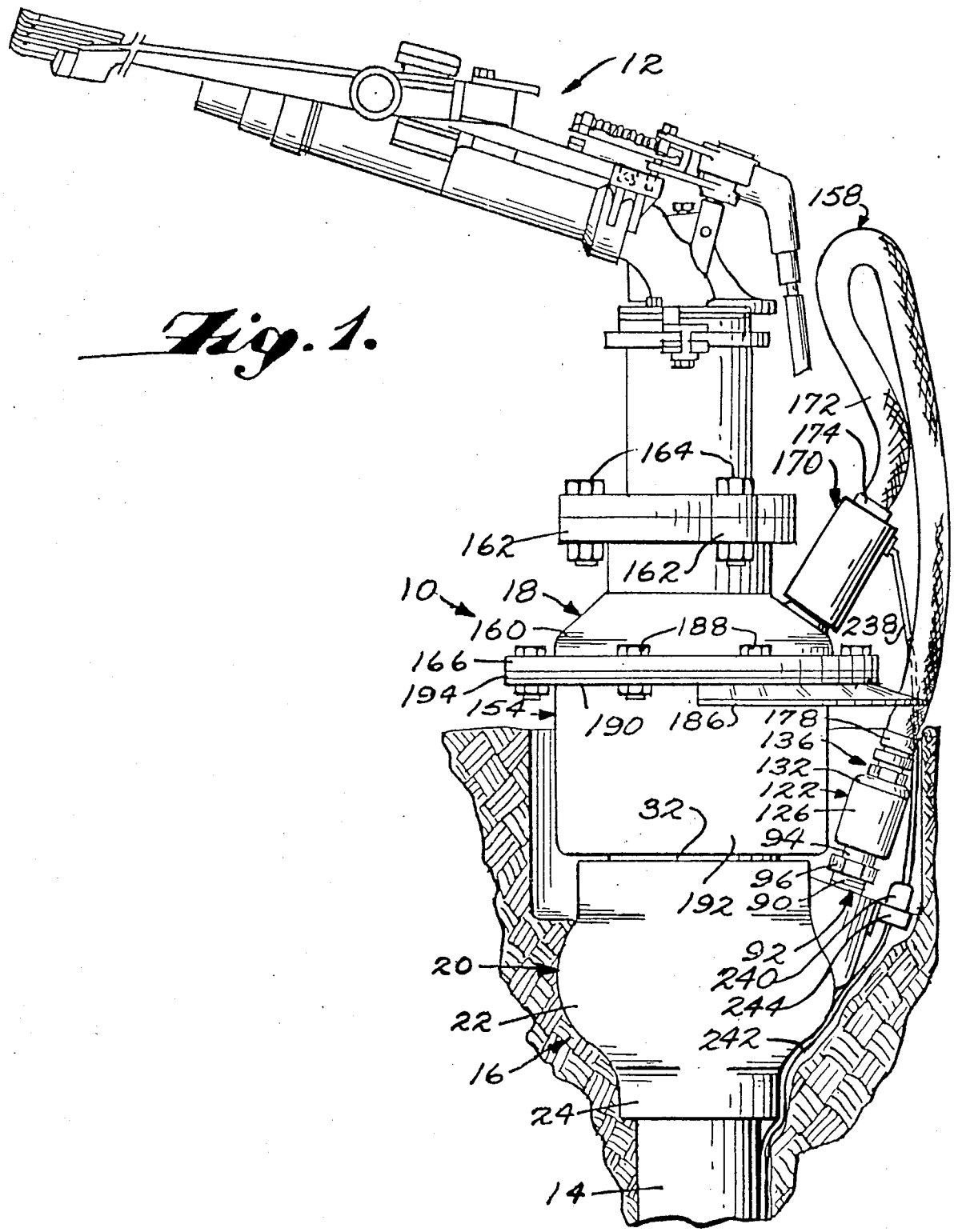
FIG. 1 is a side elevational view of an apparatus embodying the principles of the present invention showing the assemblies of the apparatus in their operative positions.

Referring now more particularly to the drawings, there is shown therein an apparatus, generally indicated at 10, for enabling a sprinkler head assembly, generally indicated at 12, to be detachably mounted on an irrigation system riser pipe, indicated at 14, containing water under pressure. The apparatus 10 is constructed in accordance with the principles innunciated in my aforesaid earlier application except for the modifications which will be clearly designated hereinafter. In general, the apparatus 10 includes an access assembly, generally indicated at 16, which is adapted to be rigidly connected to the riser pipe 14 and an accessing assembly, generally indicated at 18, which is adapted to be rigidly connected with the sprinkler head assembly 12.

While the apparatus 10 may be utilized with respect to any irrigation system riser pipe, an exemplary irrigation system which will be described hereinafter (see FIG. 12) as illustrative is an underground system for an athletic field of the type having an oval track defining therein a football playing area. In the illustrative irrigation system, each one of eight riser pipes is provided with an access assembly 16 constructed in accordance with the principles of the present invention. Of course, more than one sprinkler head assembly with attached accessing assembly 18 could be utilized. For example, a convenient number would be one such pair of interconnected assemblies for each side of the field cooperating with the four access assemblies 16 on that side of the field.

For the exemplary system noted above, it is necessary to utilize one or more high capacity sprinkler heads in order to insure that the system will provide uniform coverage without the necessity of providing a riser pipe and access assembly within the football playing area. Examples of high capacity sprinkler heads of the type herein contemplated are disclosed in the following U.S. Pat. Nos. 3,559,887, 3,744,720, 4,153,202, and commonly assigned application Ser. No. 726,382 filed Apr. 23, 1985. It will be understood that while the higher capacity impulse type sprinkler heads are contemplated for use in the exemplary irrigation system noted above, the apparatus 10 of the present invention is equally applicable with other smaller types of sprinkler heads such as impact sprinklers and the like in other irrigation systems. It is also within the contemplation of the present invention that the apparatus 10 may be utilized in any fluid pressure system where temporary access to the fluid under pressure in the system is desired.

Figure 2:
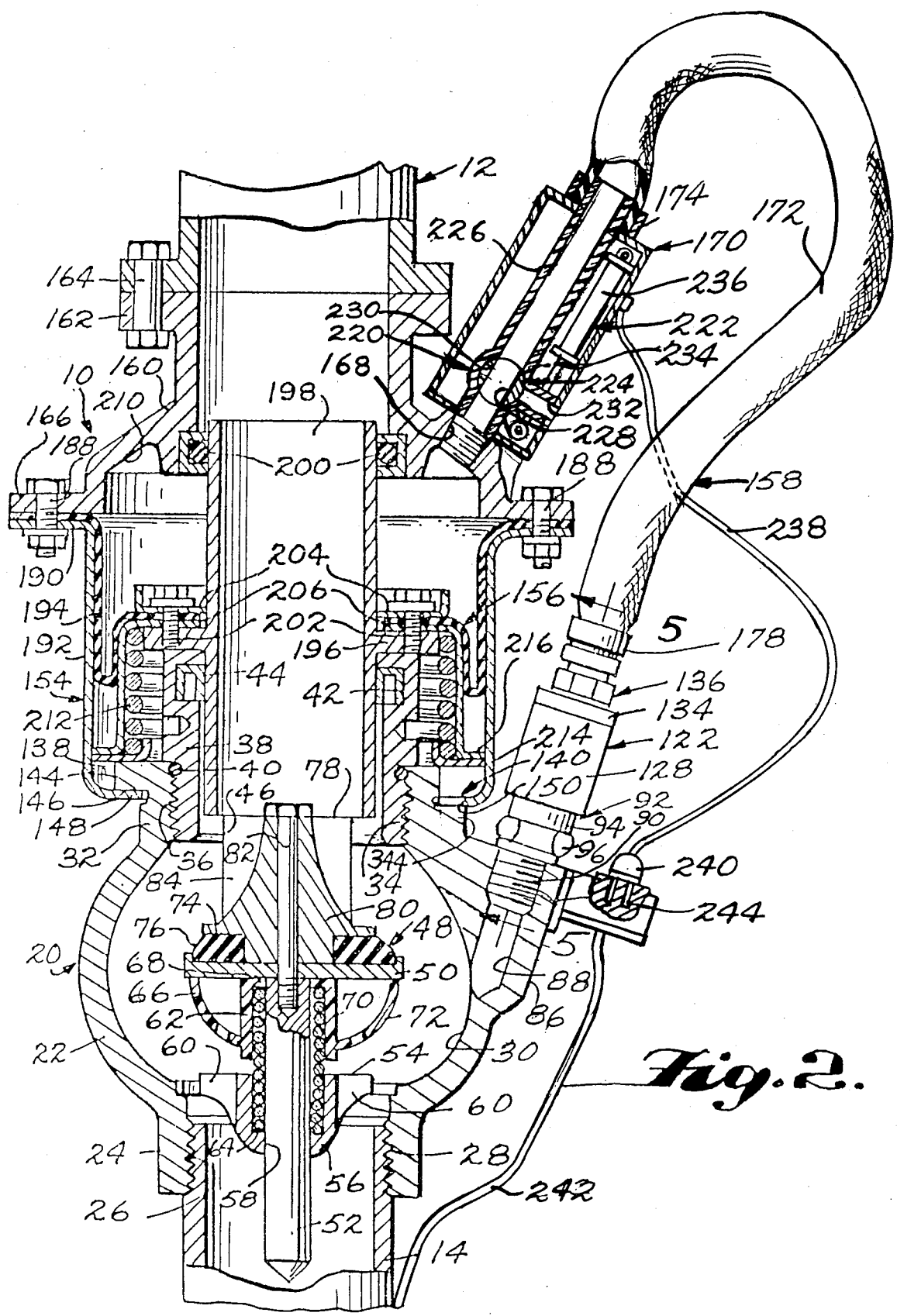
FIG. 2 is an enlarged fragmentary vertical sectional view showing the access and accessing assemblies of the present apparatus in their operative positions illustrating somewhat schematically one form of control valve and power actuator embodying the principles of the present invention.

Referring now more particularly to FIGS. 1-3, the access assembly 16 preferably comprises an access structure, generally indicated at 20, which includes a main housing member 22. The housing member 22, as shown, is in the form of a metal casting. It will be understood that other methods of making the housing member and other materials for making the same may be utilized. As shown, the housing member 22 includes a lower tubular portion 24 which is interiorly threaded, as indicated at 26, so as to be fixedly secured on the usual exterior threads 28 of the riser pipe 14. The lower tubular portion 24 provides an inlet for the water under pressure within the riser pipe 14 which inlet leads to a main chamber provided by a central globular portion 30 of the housing member 22. The housing member 22 also includes an upper tubular portion 32 which is interiorly threaded, as indicated at 34, so as to be meshingly engaged with exterior threads 36 formed on a tubular member 38 forming a part of the rigid access structure 20. As shown, there is an O-ring seal 40 provided between the tubular portion 32 of the housing member 22 and the tubular member 38 at a position outwardly of the threads 34 and 36 so as to insure that the threaded connection is water tight. The tubular member 38 extends above the tubular portion 32 and its interior periphery adjacent its upper end is formed with an annular groove 42 for receiving a pressure activated annular seal 44 of inverted U-shaped cross-sectional configuration. The lower end of the tubular member 38 is shaped to define an annular main valve seat 46. The interior periphery of the tubular member 38 above the valve seat 46 provides a main outlet for the internal chamber provided by the globular portion 30.

Mounted within the housing member 22 is a main valve assembly, generally indicated at 48. While the main valve assembly may assume any desired configuration, as shown, the valve assembly 48 includes a valve disc 50 having a valve stem 52 extending axially downwardly therefrom. The valve stem 52 is slidably mounted within a flow directing member 54 which is mounted in the inlet within the upper end of the tubular portion 24 of the housing member 22. As shown, the flow directing member 54 is formed with a core portion 56 which is centrally apertured, as indicated at 58, for slidably receiving the valve stem 52 therethrough. The flow directing member also includes a plurality of annularly spaced mounting fins 60 extending radially outwardly from the core portion 56 and seating in an appropriate annular recess formed in the upper end of the tubular portion 24.

Mounted in surrounding relation with the valve stem 52 is a coil spring 62. As shown, the lower end of the coil spring 62 is seated upon an abutment formed by a counterbore 64 formed in the core portion 56. The upper end of the coil spring 62 is operatively engaged with the valve disk 50 through a second flow directing member 66. As shown, the flow directing member 66 includes an inner washer portion 68 which is interposed between the valve disk 50 and spring 62, a cylindrical intermediate portion 70 extending down from the inner washer portion 68 and an apertured exterior portion 72 extending upwardly and outwardly from the lower end of the intermediate portion 70. The exterior surface of the exterior portion 72, like the exterior surface of the core portion 56, is shaped with a smooth curvature so as to provide for a smooth direction of flow through the inlet along the exterior periphery thereof and through the globular portion 30 along the exterior periphery thereof when the valve mechanism 48 is disposed in an open position.

As shown, the valve assembly 48 includes a resilient valve washer 74 which is mounted in a recess in the upper surface of the valve disk 50. As shown, the resilient valve washer 74 includes an outer annular surface 76 which is constructed to sealingly engage the annular valve seat 46. The valve washer 74 is fixedly attached to the valve disk 50 by a third flow directing member 78 which forms an upper part of the main valve assembly 48. The flow directing member 78 includes a core portion 80 which, like the core portion 56, is provided with an exterior periphery which is smoothly curved to direct the flow from the upper exterior periphery of the globular portion 30 outwardly through the main outlet when the valve mechanism is disposed in its open position.

The lower end of the core portion 80 is generally disk shaped in configuration and engages the upper surface of the resilient valve washer 74. A bolt 82 extending through the core portion 80 and disk valve 50 and engaged within the valve stem 52 serves to retain the resilient valve washer 74 between the core portion 80 and the disk valve 50. A central cylindrical spacer portion may be extended downwardly from the core portion 80 to limit the squeezing action of the bolt 82 on the resilient valve washer 74.

The third flow directing member 78 like the first member 54, includes a plurality of annularly spaced guide fins 84 extending radially outwardly from the core portion 80. The guide fins 84 are provided with exterior peripheral surfaces which guidingly slide within the interior periphery of the tubular member 38. In this way, both the upper and lower ends of the main valve assembly 48 are guided for reciprocating movement between opened and closed positions, as shown in FIGS. 2 and 3, respectively.

The globular portion 30 of the housing member 22 includes an enlarged boss portion 86 which is formed with a bore 88 extending therethrough and into communication with the interior of the globular portion 30. The axis of the bore 88 may typically form an angle of approximately 18° with respect to the vertical. The outer end of the bore 88 is formed with an interior tapered thread for sealingly meshing with an exterior tapered thread 90 formed on one end of a tubular fitting, generally indicated at 92. As best shown in FIG. 5, the tubular fitting 92 includes an inner tubular member 94 which provides the exteriorly threaded end for engaging the threaded end of the bore 88. On the central exterior of the member 94 are formed hexagonal flats 96 by which the member is turned into the threaded boss so as to secure a fluid type connection by the intermeshing of the tapered threads. The outer end of the member 94 has its exterior periphery formed of reduced diameter and threaded, as indicated at 98, to meshingly engage the interior threads on the interior of a second tubular member 100 forming a part of the fitting 92. The member 100 is formed with a cylindrical interior periphery 102 defining a pilot pressure outlet which leads to a resilient washer 104 fixed between the adjacent end surfaces of the tubular members 94 and 100 at a position outwardly of the threaded engagement 98 therebetween. The resilient washer 104 defines a valve seat within the central portion of the tubular fitting 92.

Figure 7:
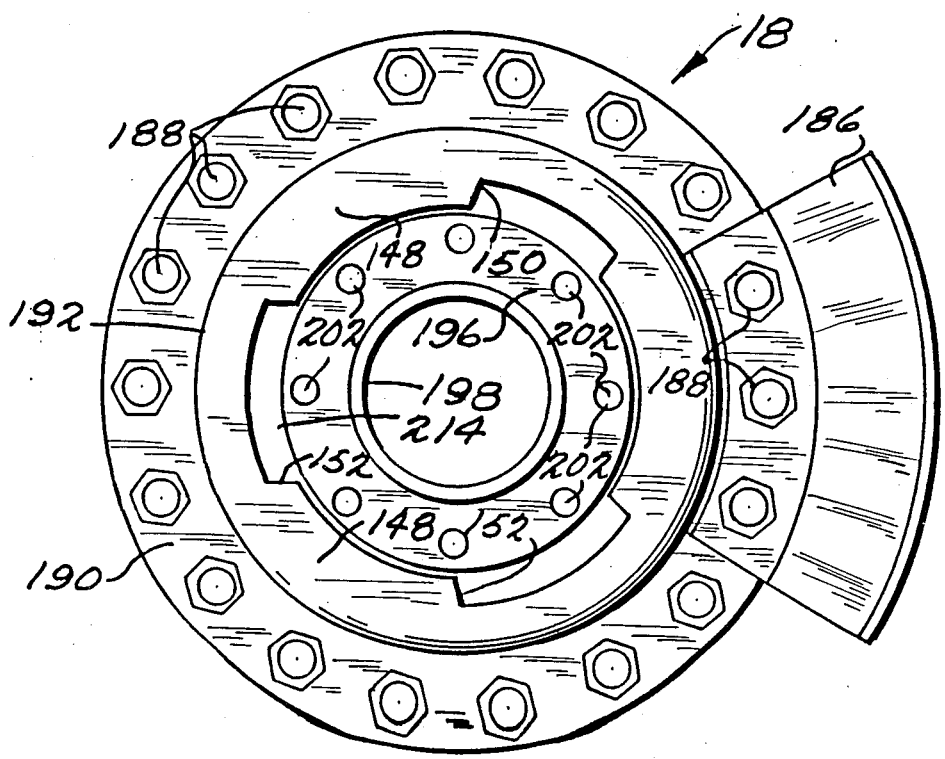
FIG. 7 is a bottom view of the accessing assembly looking in the direction of the arrows 7—7 of FIG. 3.

The inner tubular member 94 is formed with a throughbore 106 having a counterbore 108 in the outer end thereof which defines an outwardly facing annular shoulder 110. Seated on the shoulder 110 is the large end of a spiral coil spring 112, the small end of which engages a valve disk 114. The valve disk 114 forms a part of a pilot pressure valve assembly, generally indicated at 116, which serves to control or contain the water under pressure within the bore 88 of the access structure 20. The valve assembly 116 includes a cylindrical portion 118 extending outwardly from the valve disk 114. The cylindrical portion is formed with relatively large openings 120 therein and has an exterior dimension generally equal to the interior dimension of the washer 104 and less than the exterior dimension of the valve disk 114. It can be seen that the spring 112 serves to resiliently bias the valve disk 114 into a position of engagement with the valve seat provided by the resilient washer 104. The cylindrical portion 118 constitutes in effect a hollow valve stem which serves to guide the movement of the valve disk 114 between its opened position, as shown in FIG. 7, and its closed position.

The fitting 92 is provided in its outer end portion with a detachable interengaging coupling assembly, generally indicated at 122. The coupling assembly 122 includes a series of annularly spaced openings 124 extending radially through the outer end portion of the tubular member 100. Mounted within each of the openings 124 is a ball 126 having a diameter which is greater than the radial dimension of the associated opening 124. Preferably, each opening 124 is formed so that the associated ball 126 can have its inner periphery moved radially inwardly beyond the interior periphery provided by the bore 102. The configuration of each opening 124 is such, however, that the associated ball 126 cannot pass radially inwardly into the bore 102.

Slidably mounted on the exterior periphery of the member 100 is a sleeve 128. The central portion of the sleeve 128 has its inner periphery sized to slidably engage the exterior periphery of the central portion of the tubular member 100. At the outer end of the sleeve the interior peripheral surface is relieved, as indicated at 130, so that when this portion is disposed adjacent the openings 124 the associated balls 126 can move radially outwardly of the openings so that their inner peripheries are disposed within the openings. The inner end of the sleeve 128 is likewise relieved along its inner periphery to receive therein a coil spring 132 which serves to resiliently bias the sleeve 128 outwardly into abutting engagement with an annular flange 134 formed on the outer end of the tubular member 100.

The coupling assembly 122 is adapted for detachable interengagement with a cooperating coupling means 136 carried by the accessing assembly 18. However, the interengagement is to be effected only after a main mechanical connection between the access and accessing assemblies has been established by interengaging main detachable coupling means, generally indicated at 138 and 140, carried by the access assembly 16 and accessing assembly 18, respectively.

Figure 6:
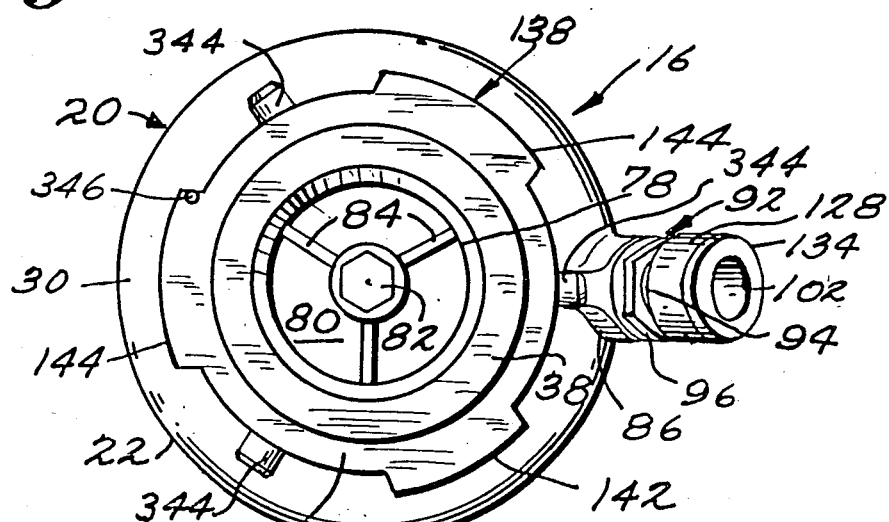
FIG. 6 is a top plan view of the access assembly looking in the direction of the arrows 6—6 of FIG. 3.

As best shown in FIG. 6, the coupling means 138 of the access assembly 16 is preferably in the form of a plurality of annularly spaced lugs including a small lug 142 and two larger lugs 144 extending radially outwardly from the annular portion 32 of the housing structure 20. As best shown in FIGS. 2 and 3, the lugs 142 and 144 include downwardly facing locking surfaces 146 which are adapted to interengage with the upwardly facing surface of an inwardly extending annular flange 148 having annularly spaced lug receiving notches formed therein including a small notch 150 corresponding in size to the lug 142 and two notches 152 corresponding in size to the lug 144. The notched flange 148 constitutes the coupling means 140 of the accessing assembly 18 and effectively provides a plurality of annularly spaced lugs which interengage with the lugs 142 and 144 to effect mechanical connection between the access structure 20 and an accessing structure, generally indicated at 154, of which the notched flange 148 is a part.

The accessing assembly 18 includes a pressure actuated operating mechanism, generally indicated at 156, which is mounted within the accessing structure 154. The operating mechanism 156 is connected with a pressure communicating assembly, generally indicated at 158, providing with the filling 92 and the coupling assemblies 122 and 136 a pilot pressure flow path for communicating a source of water under pressure from the access assembly 16 through the pilot pressure outlet 102 to the accessing assembly 18 and specifically to the operating mechanism 156 thereof to actuate the same. Such actuation, which is controlled in accordance with the principles of the present invention, is not undertaken until after the main detachable coupling means 138 and 140 are interengaged with one another to effect the aforesaid mechanical connection between the access structure 20 of the access assembly 16 and the accessing structure 154 of the accessing assembly 18. Once this mechanical connection is established, actuation of the operating mechanism 156 serves to effect a water pressure rigidified securement of the mechanical connection which has been established and to move the main access valve mechanism 48 of the access assembly 16 from its closed position into its open position.

The accessing structure 154 includes an upper member 160 which, as shown, is preferably a metal casting. The member 160 is generally of hollow annular configuration having three annularly spaced radially outwardly extending lugs 162 formed at the upper end thereof which are apertured to receive bolts 164. Bolts 164 serve to secure the sprinkler head mechanism 12 to the upper end of the member 160 which constitutes a sprinkler head outlet for the accessing structure 154.

The lower portion of the member 160 flares outwardly and terminates in an annular mounting flange 166. The lower outwardly flared portion of the member 160 is formed with an opening 168 which is provided with interior tapered threads. A power operated control assembly, generally indicated at 170, is connected at one end with the threaded opening 168. The control assembly 170, which is constructed in accordance with the principles of the present invention, will be described in detail hereinafter. For present purposes it is sufficient to note that another end thereof is connected to one end of a hose 172, as by a band coupler 174. The hose 172 constitutes an essential component of the water pressure communicating assembly 158 and its opposite end is connected with a tubular fitting 176 as by a band coupler 178.

The tubular fitting 176 includes as an integral part thereof the detachable interengaging coupling means 136 which is adapted to cooperate with the coupling means 122 provided on the access assembly 16. It will be noted that the fitting 176 includes a tubular portion 180 extending away from the band coupler 178. The extremity of the tubular portion 180 is of reduced diameter, as indicated at 182. Spaced from the extremity 18 is an annular groove 184. As shown, the axial extent of the tubular portion 180 and the relative location of the annular groove 184 with respect to the axial extent of the reduced end portion 182 is such that when the tubular portion 180 is engaged within the opening 102 provided in the tubular element or member 100 of the coupling assembly 122 with the sleeve 112 moved in a direction against the spring 132, the normally closed valve 114 will be moved by the end 182 of the tubular portion into an open position away from the valve seat 104, as shown in FIG. 5, and the annular groove 184 will be in a position to receive the balls 126. When the sleeve 128 is released allowing the spring 132 to return it to its normal spring biased position as shown in FIG. 5, the inner portion of the balls 126 are captured within the groove and the interengagement detachably retains the tubular portion 180 in coupled relation. Moreover, it will be noted that the components of the tubular portion 180 are such that the end 182 also engages the resilient washer 104 so as to provide for a watertight communication between the coupling assembly 122 and the cooperating coupling means 136 so as to insure against leakage of the water pressure from the chamber 30 of the access assembly 16 to the hose 172 of the accessing assembly.

In accordance with the principles of the present invention, means is provided for insuring that the main detachable interengaging coupling means 138 and 140 of the assemblies 16 and 18 are properly interengaged before the coupling means 136 is interengaged with the coupling assembly 122. As best shown in FIGS. 1-3 and 7, such a means is preferably in the form of a segmental guard or shield plate 186 which is mounted below the lower annular mounting flange 166 of the member 160 as by a plurality of bolts 188. As best shown in FIG. 7, the shield 186 has an arcuate segmental extent of approximately 60° and the bolts 188 which extend therethrough and through the mounting flange 166 constitute but three of a series of eighteen annularly spaced bolts 188 which extend through the mounting flange 166 and through a similar mounting flange 190 formed on the end of a second housing member 192. The housing member 192 is preferably of bent tubular metal so that the main axial extent thereof provides a cylindrical wall which extends downwardly from the inner end of the upper mounting flange 190. The notched flange 148 extends radially inwardly from the central cylindrical wall provided by the member 192. The bolts 188 serve to rigidly interconnect the member 160 and both members constitute the accessing structure 154 of the accessing assembly 18.

The operating mechanism 156 of the accessing assembly 18 includes a folded rolling seal 194, one end of which is sealingly retained between the lower mounting flange 166 of the member 160 and the upper mounting flange 190 of the member 192 by virtue of the extension of the bolts 188 therethrough.

The opposite end of the folded rolling seal 194 is connected with a mounting flange 196 formed on the central exterior periphery of a tubular member 198. The tubular member 198 constitutes a valve actuating member and is mounted within the structure 154 of the accessing assembly 18 for vertical reciprocating movement between an inoperative position, as shown in FIG. 3 and an operative position, as shown in FIG. 2. The tubular actuating member 198 is sealed exteriorly above the flange 196 by an annular seal assembly 200 suitably mounted in the interior periphery of the upper housing member 160. The opening 168 is between the seal assembly 200 and the seal provided by the water tight securement of the outer end portion of the folded rolling seal 194 between the flanges 166 and 190 by bolts 188. The inner end portion of the folded rolling seal 194 is secured in water tight relation with the flange 196 by a multiplicity of annularly spaced bolts 202 which extend downwardly through an upper exteriorly skirted washer 204, the inner end portion of the folded rolling seal 194 and an upper inwardly extending flange 206 of a cylindrical tubular member 208. The bolts 202 are threadedly engaged within suitable threaded apertures in the actuating member flange 196. It can be seen that the folded rolling seal 194 and annular seal assembly 200 define a water pressure actuating expansible and contractible chamber 210 bounded exteriorly by the interior of the portion of the housing member 160 between the seal assembly 200 and the lower flange 166 and the exterior of the portion of the actuating member 198 between flange 196 and the seal assembly 200.

The valve actuating member 198 is resiliently biased into its raised inoperative position by a coil spring 212, the upper end of which is seated beneath the flange 206 of the tubular member 208 outwardly of the flange 194 of the actuating member 198. The lower end of the coil spring 212 is seated on an interiorly skirted washer 214 which, in turn, is seated on the upwardly facing surface of the notched flange 148 of the lower housing member 192. The washer 214 extends inwardly a distance sufficient to overlay the notches 152 in the flange 148 so as to present a downwardly facing surface operable to engage the upwardly facing surfaces of the lugs 144 of the access assembly 16 when the accessing assembly 18 is initially engaged therewith. The tubular cylindrical member 208 is formed with a lower outwardly extending flange 216 which is positioned to seat on the outer marginal portion of the upper surface of the washer 214.

FIG. 2 illustrates somewhat schematically, the details of one embodiment of the power operated control assembly 170. As shown, the control assembly 170 consists essentially of a three-way control valve 220 and a power operated actuator 222, the control valve 220 is mounted in the pilot pressure flow path for movement between (1) a first position for enabling the water under pressure contained within the access assembly 20 to communicate with the operating mechanism 156 through the pilot pressure flow path and (2) a second position for preventing the water under pressure contained in the access assembly 20 from communicating with the operating mechanism 156 through the pilot pressure flow path and for communicating the operating mechanism 156 with the atmosphere so that the water under pressure can drain therefrom. The three-way control valve 220 can be of any known construction. In FIG. 2 the control valve 220 is illustratively shown as comprising a ball valve member 224 mounted within a tubular housing 226 for movement between the aforesaid first and second positions through an angular movement of 90 degrees. As shown, one end of the tubular housing 226 is sealingly engaged within the threaded opening 168 and the opposite end thereof is connected with the end of the hose 172 through the band coupler 174. When the ball valve member 224 is in its first position, as shown in FIG. 2, a main passage 228 therein serves to communicate the ends of the tubular housing 226 which in turn serves to communicate the pilot pressure flow path with the operating mechanism 156. The ball valve member 224 also includes a drain passage 230 which communicates with the operating mechanism 156 when the valve member 224 is moved into its second position. In its second position, the left hand end of the main passage 228 which communicates with the drain passage 230 communicates with a drain outlet 232 extending from the tubular housing 226.

The power operated actuator 222, as schematically shown in FIG. 2, illustratively exemplifies the utilization of a conventional solenoid assembly. The solenoid assembly includes the usual plunger 234, energizable coil and return spring, the latter two of which are contained within a housing 236 and therefore not schematically illustrated. In accordance with the principles of the present invention, an electrical wire 238 is connected at one end with the coil in the solenoid housing 236 and the opposite end of the wire 238 has connected thereto a conventional two-prong electrical plug 240. When the solenoid assembly is used as the power operated actuator 222 as schematically illustrated in FIG. 2, it is preferably utilized in conjunction with an irrigation system which has been suitably electrically wired in parallel relation with the conduits of the system. In accordance with the principles of the present invention an electric wire 242 associated with each riser pipe 14 is connected with a conventional electrical outlet socket 244 suitably carried by the associated access assembly 20. The electrical wire 242 conducts generated electrical currents which are selectively conducted thereto and, in turn, are conducted to the wire 238 through the interconnected socket 244 and plug 240 and to the coil of the solenoid assembly 222 to effect corresponding movements of the three-way control valve 220 between the first and second positions thereof.

FIG. 8 schematically illustrates a modification of the control assembly 170 in which the solenoid assembly 222 is replaced by a spring actuated timer assembly 248 which renders the control assembly particularly suited for use in irrigation systems which are installed in areas such as athletic fields, golf courses and the like where public access to the areas being sprinkled is available. In installations of this type, it is desirable to provide a power operated actuator which can be manually set to move the control valve into its first open position in conjunction with the mounting of the accessing assembly 18 on the associated access assembly 16. This insures that the operator will be at the sprinkler head assembly 12 when it is turned on so as to insure that others are out of the way. By the same token turning off the water presents no hazard to anyone and hence it is desirable that the power operated actuator assembly can be set to operate under the power provided to move the valve 220 into its second closed position after a predetermined period of time of sprinkling has elapsed. The modified power operated control assembly schematically illustrated in FIG. 8, is also particularly useful with systems which have not been hardwired in parallel relation with the conduits of the system as in FIG. 2. The spring actuated timer assembly 248 is schematically shown in the form of a spring actuated timer or clock mechanism 250 having a setting dial 252 arranged to move a rotary cam element 254 both angularly and axially. A cam follower in the form of a spring pressed plunger 256 cooperates with the rotary cam element 254 to move the control valve 220 between its first and second positions in response to the actuated setting and operation of the spring pressed timer mechanism 250. The arrangement is such that the valve 220 is normally disposed in its second position when the timer dial 252 is at a zero setting. The timer dial 252 is set by moving the same axially inwardly and then turning the dial in a clockwise direction until the pointer is at a desired setting. During this movement, a cam ramp in a first half of the rotary cam element 254 is operable to move the spring pressed plunger 256 in a downward direction, as viewed in FIG. 8, to thereby move the control valve 220 from its second position into its first position communicating the water under pressure within the pilot pressure flow path to the operating mechanism 156 to thereby open the main valve 48 so that the water in the access assembly 16 communicates through the open main valve to the accessing assembly 18 and the sprinkler head assembly 12. As soon as the timer dial 252 is set and released the engagement of the spring pressed plunger 256 with the rotary cam is shifted axially to the latter half of the cam element, thereafter clock mechanism 250 serves to effect a timed angular movement in a counterclockwise direction so that as soon as the dial 252 reaches the zero mark, the plunger 256 will engage the cam groove and be spring pressed upwardly, as viewed in FIG. 8, so as to move the control valve 220 from its second position into its first position wherein the water under pressure communicating with the operating mechanism 156 is allowed to drain through the drain outlet 232 and the water pressure in the pilot pressure flow path is shut-off therefrom. The arrangement schematically illustrated in FIG. 8 is similar to the arrangement illustrated in U.S. Pat. No. 2,772,067 except that the latter includes a two-way control valve rather than a three-way control valve. For purposes of further background information, the disclosure of U.S. Pat. No. 2,772,067 is hereby incorporated by reference into the present specification. It will be understood that other known power operated actuators may be utilized.

FIG. 9 illustrates an arrangement similar to that described in U.S. Pat. No. 4,592,505 the disclosure of which is hereby incorporated by reference into the present specification. Schematically illustrated in FIG. 9 is a power operated control assembly 258 which includes a control valve 260 and a power operated actuator 262. The actuator 262 includes an electric motor 264 which drives a gear reduction mechanism 266. The control valve 260 which is schematically illustrated includes two ball members 268 and 270 which are connected for movement within a tubular housing 272 in one angular direction through successive 90 degree movements so that the two functions achieved by the first and second positions of the control valve member 224 shown in FIGS. 2 and 8 are accomplished by successive movements. In order to stop the motor 264 and gear reduction mechanism 266 unit after turning the ball valves 90 degrees, there is provided a cam switching assembly 274. The energization of the electric motor 264 is accomplished by battery 276 which is under the control of the switching assembly 274 and a computerized programmer schematically illustrated at 278. In accordance with known practices, the computerized programmer can be programmed to effect two movements of the control valve members 268 and 270. FIG. 9 illustrates the position of valve member 268 and 270 after the first movement. It will be noted that valve member 270 closes off a drain line 280 communicating with the operating mechanism 156 and valve member 268 communicates the operating mechanism 156 with pilot pressure flow path. In the next position, the pilot pressure flow path is cut off from communication by the closed valve member 268 and the operating mechanism 156 is vented to drain through the open valve member 270.

FIG. 10 illustrates another modification of the arrangement shown in FIG. 9 wherein the computerized programmer 278 is replaced by wave receiver circuitry schematically designated at 282 which is operable in response to the receipt of remotely transmitted electromagnetic waves of a predetermined signal configuration to energize the motor 264 which is cut off by the operation of the cam switching assembly 224 after a 90 degree angular movement has taken place. FIG. 10 schematically illustrates a signal transmitter 284 capable of transmitting electromagnetic waves suitable to actuate the receiver circuitry 282.

In all of the illustrative embodiments of the control assembly thus far described, the control assembly is carried by the accessing assembly 18. This is regarded to be of advantage since in any given system the number of accessing assemblies provided will be substantially less than the number of access assemblies provided. Nevertheless, it is within the contemplation of the invention that a control assembly could be embodied in each access assembly 16 at a position between the tubular fitting 90 and the threaded opening communicating with the passage 88 within which it is mounted. While it would be preferable to utilize the pilot pressure valve 114 for closing off the pilot pressure flow path the latter could be eliminated if desired with separate containment residing solely in the control assembly. Utilizing the pilot pressure control valve 114 with the power operated control assembly would prevent accidental flow of water out of the part of the pilot pressure flow path carried by the access assembly 16 when the remaining part thereof carried by the accessing assembly 18 is not connected therewith.

Referring now more particularly to FIG. 11 in the drawings, there is shown therein an athletic field, generally indicated at 320 of the type which includes an oval track 322 defining therein a football playing area 324. FIG. 11 illustrates a typical prior art underground installation for operation with existing medium capacity sprinkler head assemblies fitted with couplers of the prior art type for cooperative engagement with the valve assemblies of the underground system. In FIG. 11, the underground system is indicated generally by the reference numeral 326. As shown, the system includes a suitable source of water under pressure which may be a city main or, as shown, includes a motor 328 driving a pump 330 which draws water from a well or pond and delivers it under pressure to an outlet pipe 332. Flow in the outlet pipe 332 is controlled by a main valve 334. From the main control valve 334 water is distributed by suitable branch piping to three main lines 336, 338 and 340. As shown, these lines are mounted underground parallel with the football field with the middle line 338 running beneath the middle of the playing field while the two lateral outside lines are along the sidelines. Extending upwardly from each line are five spaced riser pipes which are capped off by conventional valve assemblies 342. Examples of the valve assemblies 342 which may be utilized are the "SureQuick" turf valves such as manufactured by Rainbird, the "400" or "800" series of quick coupling valves manufactured by Skinner and the quick coupling system manufactured by Royal Coach Sprinklers.

The arrangement is such that each valve assembly 342 is accessed by a coupler (not shown) which in turn carries a sprinkler head (not shown). In the system shown, the sprinkler head should be of the part-circle type capable of being adjusted to full circle mode of operation. FIG. 11 illustrates the sprinkler pattern of the sprinkler head when coupled with each one of the 15 valve assemblies 342 of the system. The arrangement, as shown, would include the operation of sprinkler heads in full circle mode in conjunction with the valve assemblies 342 of the central line 338. The sprinkler head would be adjusted for half-circle operation when accessed with the valve assemblies 342 of the outside lines 336 and 340. It will be noted that the overlapping sprinkler patterns provide for full coverage of the football playing area but that there are provided five valve assemblies 342 which are exposed on the playing surface of the football field, a condition which can cause player injury. It will also be understood that the system as shown in FIG. 11 may be utilized with a single sprinkler head and attached coupler or that more than one such combined assemblies can be utilized. The usual situation is that there are a substantially lesser number of coupler-sprinkler head assemblies (e.g. one, two or three) utilized than valve assemblies (e.g. fifteen). The system itself is not an automatic system and is provided primarily to cut initial equipment costs. For example, an automatic system comparable to the system disclosed would require fifteen coupler-sprinkler head assemblies (rather than one, two or three) to be controlled by the additionally provided automatic control equipment. Heretofore a low cost arrangement such as depicted in FIG. 11 could not be provided in a football playing area without the disadvantage of mounting valve assemblies in the playing area.

The invention disclosed in my earlier application when utilized to replace the prior art arrangement obtained significant improvements however the system remained essentially a manual or nonautomatic system. By utilizing the present invention all of the advantages over the prior art can be obtained and in addition the system can be converted from a manual or nonautomatic system to a semiautomatic system. The nature of this semiautomatic operation of the system will become apparent by consideration of the modifications in the system shown in FIG. 12 which will be described in conjunction with the use of the accessing assemblies 18 having the control assembly 170 shown in FIG. 8.

It will be noted from FIG. 12 that the underground piping system of FIG. 11 can be simplified in that the central line 338 can be eliminated and the two outside lines 336 and 340 can be spaced apart a distance slightly greater than in the prior art arrangement of FIG. 11. In the arrangement shown in FIG. 12, there are riser pipes provided for eight access assemblies 16, four on the line 336 and four on the line 340.

With reference to FIG. 3 of the drawings which shows an access assembly 16 in its inoperative position and an accessing assembly 18 separated therefrom in vertically spaced relation, it will be noted that the main valve assembly 48 is in its closed position preventing water within the chamber 30 from passing outwardly through the outlet provided by the tubular member 38. Similarly, the pilot valve 114 within the fitting 92 is engaged with the seat 104 preventing water under pressure within the chamber 30 from passing outwardly through the end of the pilot fitting. When it is desired to obtain access to any one of the access assemblies 16 the accessing assembly 18 with the sprinkler head 12 attached thereto is positioned in axial alignment over the access assembly 16 as shown in FIG. 3 with the small notch 150 located in a position above the small lug 142. It will be noted that when the accessing assembly 18 is so oriented with respect to the access assembly 16, guard plate 186 is disposed directly above the opening 102 of the fitting 94. Of course, it would not be appropriate to interengage the coupling member 136 with the coupling assembly 122 before the main coupling means 138 and 140 of the two assemblies are interengaged because the actuation of the operating mechanism 156 of the assembly 18 would occur without performing any useful function. Nevertheless, the position of the guard plate 186 serves as a reminder to the operator that the main coupling means 138 and 140 should be interengaged before the pilot coupling means 122 and 136 because the guard plate prevents the main coupling means 138 and 140 from being interengaged when the pilot coupling means are interengaged.

The interengagement of main coupling means 138 and 140 is commenced by simply moving the access assembly 18 rectilinearly downwardly from the position shown in FIG. 3. As this movement takes place the lower end of the tubular actuating member 198 of the accessing assembly enters into the interior of the annular member 38. This interengagement provides an initial guiding function to the subsequent downward movement of the accessing structure 154. The next engagement which takes place is that the lower surface of the washer 214 extending over the notches 150 and 152 is engaged by the upper surfaces of the three lugs 142 and 144. Further downward movement enables the notched flange 148 to be disposed at a vertical level below the lower surfaces 146 of the lugs 142 and 144. As best shown in FIGS. 2 and 6, the exterior of the main housing member 22 is formed with three annularly spaced integral stop portions 344 which are engaged by the downwardly facing surfaces 146 of the lugs 142 and 144 in order to establish when the aforesaid vertical level has been reached. During this latter movement, spring 212 is compressed by virtue of the relative downward movement of the member 208 with respect to the washer 214 which remains relatively stationary. Once this downward axial movement has been accomplished, the interengagement is completed by turning or rotating the accessing structure 154 about its axis in a clockwise direction as viewed in FIG. 6 so as to interengage the lug surfaces 146 with the upper surface of the notched flange 148. It will be noted that the washer 214 because of its continuous annular surface is maintained in surface contact with the upper surfaces of the lugs 142 and 144. The lugs provided by the notched flange 148 are fully interengaged with the lugs 142 and 144 after a turning movement through approximately 55°. As best shown in FIG. 6, a stop pin 346 in one of the lugs 144 serves to limit the extent of the turning movement by engagement with the adjacent surface of the notched flange 148. A 55° turn is sufficient to angularly displace the guard plate 186 so that it no longer overlies the coupling assembly 122 of the access assembly 16.

After this turning movement has been completed, the main coupling means 138 and 140 of the two assemblies 16 and 18 have achieved a mechanical connection between the structures 20 and 154 of the two assemblies. This mechanical connection has been achieved however with a simple manual movement and its rigidity is determined by the strength of spring 212 which is not chosen to be relatively stiff. An important feature is that the mechanical connection can be established by a relatively effortless manual movement so as to achieve a mechanical connection which requires additional rigidification to be effective to withstand the forces transmitted thereto by the high capacity sprinkler head assembly 12 during operation. The additional rigidification of the connection is accomplished by the actuation of the operating mechanism 156 which is under the control of the power operated control assembly 170. With the embodiment shown in FIG. 9, it is assumed that the timer dial 252 will initially be at its zero setting so that the valve member 244 is in its second closed position wherein communication of the pilot pressure flow path is cut off from the operating mechanism 156 which is communicated to the drain opening 232. However, before the control assembly 170 can be effective to exercise control, the portion of the pilot pressure flow path associated with the access assembly 16 must be connected with the portion thereof associated with the accessing assembly 18. This connection is accomplished simply by interengaging the pilot coupling means 136 at the end of the hose 172 of the accessing assembly 18 with the coupling assembly 122 of the access assembly 16. These two units are of generally known construction and as previously indicated when interengaged they serve not only to effect a mechanical securement but to provide for a watertight valve opening water pressure communicating function as well. It will be understood that other functionally similar units may be utilized, if desired.

As soon as coupling means 136 is interengaged with the coupling assembly 122, water pressure within the chamber 30 is communicated to the interior of the hose 172 and is available to be controlled by the control assembly 170. As previously indicated, once the operator has determined by visual inspection of the area that it is all clear to commence watering, the operator simply turns the dial clockwise as viewed in FIG. 9 until the pointer points at the desired setting in terms of numbers of hours of watering operation. The turning of the dial 252 has the effect of moving the valve member 224 from its second closed position into its first open position as shown in FIG. 8. In this position the passage 228 of the valve member 224 serves to communicate the water under pressure contained within the interior of the hose 172 and the adjacent part of the pilot pressure flow path with the operating mechanism 156. The increased water pressure acting on the movable operating mechanism 156 causes the actuating member 198 and the cylindrical member 208 fixed thereto to move downwardly with respect to the fixed housing structures 30 and 154. As the actuating member 198 moves downwardly the lower end thereof engages the upper surface 78 of the fins 84 of the main valve mechanism 48 thus moving the valve member 76 downwardly away from the valve seat 46. This allows water under pressure within the chamber 30 to flow through the outlet opening defined by the valve seat 46 past the flow directing core portion 80 and fins 84 of the third flow directing member and into the interior of the actuating member 198. The exterior of the actuating member is sealed at opposite ends by the seal 44 and the seal assembly 200. In this way the interior of the actuating member 198 serves to communicate the water under pressure from the chamber 30 to the sprinkler head outlet provided by the housing member 160 which in turn is communicated with the inlet of the sprinkler head 112.

FIG. 2 illustrates the fully opened position of the main valve member 48 when the actuating member 198 reaches the bottom extent of its vertical movement. It will be noted that the three flow directing members 54, 66 and 80 serve to reduce the turbulence in the water flow as it passes out of the discharge end of the riser pipe 14 and into the smooth interior of the actuating member 198.

The lowermost position of the actuating member 198 is determined by the engagement of the flange 196 of the tubular member 198 engaging the upper surface of the cylindrical member 38, as shown in FIG. 2. This interengagement provides for the rigidification of the mechanical connection between the two rigid structures 20 and 154 previously described.

It is important to note that the power operation embodied in the actuator 248 in the form of the spring actuated timer mechanism 250 renders the system semiautomatic in its operation because shut off does not require a manual operation or, more importantly, a shut off of the water in the system itself or any part thereof. Instead, after the desired time of operation has elapsed, the operation of the rotary cam element 254 is such as to cause the valve member 224 to move back into its second closed position allowing the water under pressure in the operating mechanism 156 to drain out under the action of springs 70 and 212 which, in turn, moves the main valve assembly 48 into its closed position and relieves the rigidification from the simple mechanical connection between the access and accessing assemblies. The accessing assembly 18 with the attached sprinkler head assembly 12 can then be readily detached from the access assembly 16 to which it has bee interengaged and moved into interengagement with another one of the access assemblies 16 of the system when the operator thereafter desires. Disengagement is accomplished essentially by reversing the procedures previously described. In this regard it will be noted that the guard plate 186 is disposed in a position such that it would not be possible for an operator to effect a counter clockwise turning movement, notwithstanding the rigidification of the mechanical connection provided by the water pressure. That is, the edge of the guard plate 186 would engage the hose 172 to prevent such turning movement. Again, the guard plate 186 reminds the operator that he should detach the coupling means 126 from the coupling assembly 122 before undertaking any such turning movement. This detachment is accomplished as aforesaid by simply moving the sleeve 128 downwardly and pulling out the fitting 178 and then releasing the sleeve 128. As the fitting 178 moves outwardly the pilot valve closes to prevent escape of water under pressure from chamber 30.

As previously indicated, the control assembly 170 with the timer actuator 248 as shown in FIG. 8 is desirable for use with systems where the public has access to the area being sprinkled. In agricultural irrigation systems, where public access is not available and the system can be or is hardwired, the solenoid actuator of FIG. 2 is preferable. This actuator can add a further degree of automation to this system by enabling the individual accessing units to be both turned off and turned on by remote operation such as, for example, a conventional controller, such as used in fully automatic systems. An advantage achieved by this added degree of automation is that a plurality of sprinkler head assemblies can be mounted in a single conduit line and operation can be stepped from one sprinkler head to the next or from two sprinkler heads to the next two sprinkler heads. The control assembly 258 of FIGS. 9 and 10 can achieve this added degree of automation where hardwiring is not available to operate a solenoid assembly. Since the motor 264 is energized only to effect a 90 degree turn of the ball valve it can be operated by a relatively small battery 276 without rendering the life of the battery so short as to be inconvenient. Where the programmer is used, successive programs can be set for successive actuators to accomplish the sequential operation of a plurality of sprinkler heads in the same line. Similarly, the remote electromagnetic wave signal transmitter 284 can likewise be used to accomplish such a sequencing where the wave receiver circuitry 282 of each unit is set to actuate at a different signal.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

I claim:

1. A method of temporarily connecting separate accessing structure with access structure having a main outlet and a pilot pressure outlet so as to communicate fluid under pressure contained within said access structure with said accessing structure through the main outlet of said access structure which comprises the steps of manually establishing a mechanical connection of said accessing structure with said access structure without establishing communication of the fluid under pressure contained in said access structure with said accessing structure through said main outlet, manually establishing a pilot pressure flow path through the pilot pressure outlet to said accessing structure for fluid under pressure contained within said access structure, utilizing a power source other than said fluid under pressure to selectively control the communication of fluid under pressure contained in said access structure with said accessing structure through said pilot pressure flow path, and utilizing the fluid under pressure selectively communicated with said accessing assembly through said pilot pressure flow path as a power source to establish communication of the fluid under pressure contained in said access structure with said accessing structure through said main outlet.

2. A method as defined in claim 1 wherein the manually established mechanical connection of said accessing structure with said access structure is less rigid than the rigidity finally required and utilizing the fluid under pressure communicated to said accessing assembly through said pilot pressure flow path as a power source to rigidify the manually established mechanical connection to the rigidity finally required.

3. Apparatus for temporarily accessing fluid under pressure comprising access structure for containing the fluid under pressure, separate fluid accessing structure separate from said access structure cooperable therewith to obtain temporary access to the fluid under pressure contained in said access structure, main interengaging means for manually establishing a mechanical connection of said accessing structure with said access structure without establishing communication of the fluid under pressure contained in said access structure with said accessing structure through said main outlet, second interengaging means for manually establishing a pilot pressure flow path through the pilot pressure outlet to said accessing structure for fluid under pressure contained within said access structure, power operated means in said pilot pressure flow path for selectively communicating fluid under pressure contained in said access structure to said accessing structure through said pilot pressure flow path, and means for utilizing the fluid under pressure selectively communicated to said accessing assembly through said pilot pressure flow path as a power source to establish communication of the fluid under pressure contained in said access structure with said accessing structure through said main outlet.

4. Apparatus as defined in claim 3 wherein the manually established mechanical connection of said accessing structure with said access structure is less rigid than the rigidity finally required, and said fluid pressure utilizing means also functions to utilize the power source to rigidify the manually established mechanical connection to the rigidity finally required.

5. A method of temporarily connecting a sprinkler head assembly having water accessing structure with access structure having a main outlet and a pilot pressure outlet so as to communicate water under pressure contained within said access structure with the accessing structure of said sprinkler head assembly through the main outlet of said access structure which comprises the steps of manually establishing a mechanical connection of the accessing structure of said sprinkler head assembly with said access structure without establishing communication of the water under pressure contained in said access structure with said accessing structure through said main outlet, manually establishing a pilot pressure flow path through the pilot pressure outlet to said accessing structure for water under pressure contained within said access structure, utilizing a power source other than said water under pressure to selectively control the communication of water under pressure contained in said access structure with said accessing structure through said pilot pressure flow path, and utilizing the water under pressure selectively communicated with said accessing assembly through said pilot pressure flow path as a power source to establish communication of the water under pressure contained in said access structure with said accessing structure through said main outlet for passage through said sprinkler head assembly.

6. A method as defined in claim 5 wherein the manually established mechanical connection of said accessing structure with said access structure is less rigid than the rigidity finally required and utilizing the water under pressure communicated to said accessing assembly through said pilot pressure flow path to rigidify the manually established mechanical connection to the rigidity finally required.

7. A method as defined in claim 5 wherein said other source of power comprises spring means carried by the accessing structure.

8. A method as defined in claim 5 wherein said other source of power comprises a generated electric current available at the access structure.

9. A method as defined in claim 5 wherein said other source of power comprises a battery carried by the accessing structure.

10. Irrigation apparatus for temporarily accessing water under pressure comprising
access structure having a main outlet and a pilot pressure outlet for containing the water under pressure,
a sprinkler head assembly having water accessing structure separate from said access structure cooperable therewith to obtain temporary access to the water under pressure contained in said access structure,
main interengaging means for manually establishing a mechanical connection of the accessing structure of said sprinkler head assembly with said access structure without establishing communication of the water under pressure contained in said access structure with said accessing structure through said main outlet,
second interengaging means for manually establishing a controllable pilot pressure flow path through the pilot pressure outlet to said accessing structure for water under pressure contained within said access structure,
power operated means in said pilot pressure flow path for selectively communicating water under pressure contained in said access structure to said accessing structure through said pilot pressure flow path, and
means for utilizing the water under pressure selectively communicated to said accessing assembly through said pilot pressure flow path as a power source to establish communication of the water under pressure contained in said access structure with said accessing structure through said main outlet for passage through said sprinkler head assembly.

11. Irrigation apparatus as defined in claim 10, wherein the manually established mechanical connection of said accessing structure with said access structure is less rigid than the rigidity finally required, and said water pressure utilizing means also functions to utilize the power source to rigidify the manually established mechanical connection to the rigidity finally required.

12. Apparatus as defined in claim 11 wherein said access structure includes chamber means for containing water under pressure for communication with said main outlet and said pilot pressure outlet and inlet means for communicating with said chamber means, means on said access structure for enabling the same to be fixedly mounted on the riser pipe in a relationship such that said inlet means is in communication with water under pressure within the riser pipe, said accessing structure including sprinkler head outlet means, means on said accessing structure for enabling a sprinkler head assembly to be secured on said accessing structure in a relationship such that said sprinkler head outlet means is communicated with the sprinkler head assembly, said water pressure utilizing means comprising main valve means mounted on said access structure with respect to said main outlet for movement between (1) a closed access position preventing water under pressure within said chamber means from flowing through said main outlet and (2) an opened accessed position enabling water under pressure within said chamber means to flow through said main outlet, and operating means mounted on said accessing structure for movement from an inoperative position into an operative position in response to the communication of water under pressure therewith to thereby effect movement of said main valve means into its open position and establish communication of water under pressure from said chamber means with said sprinkler head outlet means through said main outlet means.

13. Apparatus as defined in claim 12 wherein said power operated means comprises control valve means mounted in said pilot pressure flow path for movement between (1) a first position for enabling the water under pressure contained in said access structure to communicate with said operating means through said pilot pressure flow path and (2) a second position for preventing the water under pressure contained in said access structure from communicating with said operating means through said pilot pressure flow path and for communicating said operating means with the atmosphere and power operated means for moving said control valve means.

14. Apparatus as defined in claim 13 wherein said power operated means is carried by said accessing structure and comprises a manually set spring actuated timer assembly.

15. Apparatus as defined in claim 13 wherein said power operated means comprises a solenoid assembly.

16. Apparatus as defined in claim 13 wherein said power operated means is carried by said accessing structure and comprises a battery operated electrical motor assembly and means for controlling the energization of said motor to move said control valve means.

17. Apparatus as defined in claim 16 wherein said motor energization controlling means includes a computerized programmer.

18. Apparatus as defined in claim 16 wherein said motor energization controlling means includes a wave receiver operable in response to the receipt of predetermined signal means in remotely transmitted electromagnetic wave form for controlling the energization of the motor.

19. Apparatus as defined in claim 12 wherein said operating means includes a hollow valve actuating member having an open upper end portion slidably sealingly mounted in said sprinkler head outlet means for reciprocating movement between inoperative and operative position, said valve actuating member having a lower end portion adapted to engage and move said main outlet valve means from its closed position into its opened position when said tubular member is moved from its inoperative position into its operative position, the lower end portion of said valve actuating member being configured to communicate water under pressure from said chamber means flowing through said main outlet means with the interior of said valve actuating member.

20. Apparatus as defined in claim 19 wherein said main interengaging means includes opposed locking surface means movable (1) into interengaging relation after a turning movement of said accessing structure with respect to said access structure in one direction and (2) out of interengaging relation after a turning movement of said accessing structure with respect to said access structure in an opposite direction, and interlock means for preventing the interengagement of said second detachable interengaging means until after said accessing structure has been turned in said one direction to move said opposed locking surface means into interengaging relation and for preventing a turning movement of said accessing structure in said one direction to move said opposed locking surface means out of interengaging relation until after the detachment of said second detachable interengaging means.

21. Apparatus as defined in claim 20 wherein said interlock means comprises a segmental guard plate fixed to said access structure in a position to permit movement (1) and (2) only when said second detachable interengaging means is detached.

22. Apparatus as defined in claim 12 wherein said second interengaging means includes a first tubular fitting communicating at one end with said chamber means and being open at its opposite end, means defining an annular pilot valve seat within said first fitting between the ends thereof, a pilot valve member mounted in said first fitting for movement toward and away from said pilot valve seat and pilot spring means acting on said pilot valve member to bias the same to move into a direction toward the open end of said female fitting and into closing engagement with said pilot valve seat, a flexible hose communicating at one end with said operating means and a second tubular fitting on the opposite end of said hose of a size to engage within said first fitting, detachable interengaging elements carried by said first and second fittings operable when in interengaging relation to secure said second fitting in an operative position of engagement within said first fitting, said second fitting having means operable when in said operative position for maintaining said pilot valve member in spaced relation from said pilot valve seat and the interior of said second fitting in water pressure communicating relation with the interior of the end of said first fitting communicating with said chamber means.

23. Apparatus as defined in claim 12 wherein said access structure includes a main housing member comprising axially spaced and axially aligned first and second tubular portions having a globular portion therebetween, the interior of said first tubular portion providing said inlet means, the interior of said globular portion providing said chamber means, said main outlet means being provided by a tubular member fixed within said second tubular portion and extending outwardly therefrom, means on the inner end portion of said tubular member defining an annular main valve seat, said main valve means comprising a main valve assembly mounted within said housing member for movement toward and away from said main valve seat and main spring means acting on said main valve assembly to bias the same in a direction toward the outwardly extending portion of said tubular member and into closing engagement with said main valve seat.

24. A water pressure access assembly for connection with an irrigation system riser pipe containing water under pressure, said water pressure access assembly comprising an access structure providing (1) chamber means for containing water under pressure (2) inlet means for communicating with said chamber means (3) main outlet means for communicating with said chamber means and (4) pilot pressure outlet means for communicating with said chamber means, means on said access structure for enabling the same to be fixedly mounted on the riser pipe in a relationship such that said inlet means is in communication with water under pressure within the riser pipe, main valve means mounted with respect to said main outlet means for movement between (1) a closed access position preventing water under pressure within said chamber means from flowing through said main outlet means and (2) an opened accessed position enabling water under pressure within said chamber means to flow through said main outlet means, first detachable means on said access structure for enabling an accessing assembly connected with a sprinkler head assembly to be conveniently manually detachably secured to said access structure in a relationship such that access to water under pressure within said chamber means can be obtained by movement of said main valve means into said opened position, pilot pressure valve means mounted with respect to said pilot pressure outlet means for movement between (1) a closed inoperative position preventing water under pressure within said chamber means from flowing through said pilot pressure outlet means and (2) an opened operative position enabling water under pressure within said chamber means to flow through said pilot pressure outlet means, second detachable means on said access structure for enabling a pilot pressure communicating means of the accessing assembly to be conveniently manually detachably secured with said access structure in a relationship such that access to the water under pressure within said chamber means can be obtained through said pilot pressure outlet means when said pilot pressure valve means is in said opened position and electrical outlet means associated with said access structure for providing electrical access to a selectively transmitted electrical current so as to enable a solenoid operated control valve in the pilot pressure communicating means of the accessing assembly to utilize the electrical current as a power source in selectively operating the solenoid operated control valve.

25. A water pressure accessing assembly for connection with a sprinkler head assembly for enabling the sprinkler head assembly to be selectively connected with an irrigation system containing water under pressure in accessed relation to the water under pressure therein, said water pressure assembly comprising:

an accessing structure providing sprinkler head outlet means, first detachable means on said accessing structure for enabling said accessing assembly to be conveniently manually detachably secured to an access assembly of the irrigation system having chamber means communicating with a main outlet means controlled by main valve means and a pilot pressure outlet means controlled by pilot pressure valve means in a relationship such that access to water under pressure within the chamber means through the main outlet means of the access assembly can be obtained when the main valve means of the access assembly is opened for communication with said sprinkler head outlet means, means on said accessing structure for engaging a sprinkler head assembly to be secured on said accessing structure in a relationship such that said sprinkler head outlet means is communicated with the sprinkler head assembly, operating means mounted on said accessing structure for movement from an inoperative position into an operative position in response to the communication of water under pressure therewith, means for communicating a source of water under pressure with said operating means to thereby effect movement of said operating means from said inoperative position into said operative position, second detachable means operatively associated with said water pressure communicating means for conveniently manually detachably connecting said water pressure communicating means with the access assembly in a relationship such that access to water under pressure within the chamber means of the access assembly for communication with the said operating means by said water pressure communicating means can be obtained through pilot pressure outlet means of the access assembly when the pilot pressure valve means thereof is opened, control valve means in said water pressure communicating means movable between (1) a first position for enabling water under pressure within the chamber means of the access assembly to communicate with said operating means and (2) a second position for preventing water under pressure within the chamber means of the access assembly to communicate with said operating means and enabling water under pressure in said operating means to drain therefrom, and power operated means for moving said control valve means.

26. Apparatus as defined in claim 25 wherein said power operated means comprises a solenoid assembly carried by said accessing structure and means including electrical plug means for detachably engaging electrical outlet means provided adjacent said access structure and connected with a selectively transmitted generated electrical current.

27. Apparatus as defined in claim 25 wherein said power operated means comprises a manually settable spring actuated timer assembly carried by said accessing structure and operable to move said control valve means into its second position after a predetermined time.

28. Apparatus as defined in claim 25 wherein said power operated means comprises a battery operated electrical motor and means for controlling the energization of said motor to move said control valve means into said first and second positions.

29. Apparatus as defined in claim 28 wherein said motor energization controlling means includes a computerized programmer.

30. Apparatus as defined in claim 28 wherein said motor energization controlling means includes a wave receiver operable in response to the receipt of predetermined signal means in remotely transmitted electromagnetic wave form for controlling the energization of the motor.

31. Apparatus as defined in claim 25 wherein said operating means includes a hollow valve actuating member having an open upper end portion slidably sealingly mounted in said sprinkler head outlet means for reciprocating movement between inoperative and operative position, said valve actuating member having a lower end portion adapted to engage and move said main outlet valve means from its closed position into its opened position when said tubular member is moved from its inoperative position into its operative position, the lower end portion of said valve actuating member being configured to communicate water under pressure from said chamber means flowing through said main outlet means with the interior of said valve actuating member.

32. Apparatus as defined in claim 31 wherein the central exterior of said valve actuating member is provided with an annular flange, said annular member including an upper portion fixed to said annular flange and a cylindrical portion extending downwardly from said upper portion.

33. Apparatus as defined in claim 32 wherein said operating means includes coil spring means inwardly of said cylindrical portion operatively engaged with said upper portion for biasing said annular member and said valve actuating member upwardly toward said inoperative position.

34. Apparatus as defined in claim 32 wherein said accessing structure includes (1) an upper housing member having an upper tubular portion providing said sprinkler head outlet means and a lower exterior flange portion and (2) a lower housing member having an upper exterior flange portion fixed to said lower flange portion and a cylindrical extending downwardly from said upper flange portion.

35. Apparatus as defined in claim 34 wherein said operating means includes a folded rolling seal having (1) an outer end portion sealingly fixed between said upper and lower flange portions and rollingly engaging the interior of the cylindrical wall portion of said lower housing member and (2) an inner end portion sealingly fixed to the annular flange of said valve actuating member and rollingly engaging the exterior of the cylindrical portion of said annular member.

* * * * *